US008621436B2

(12) United States Patent
Eguchi

(10) Patent No.: US 8,621,436 B2
(45) Date of Patent: Dec. 31, 2013

(54) COMPUTER READABLE MEDIUM, VERIFICATION SUPPORT METHOD AND VERIFICATION SUPPORT APPARATUS

(75) Inventor: Hiroyuki Eguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 535 days.

(21) Appl. No.: 12/896,311

(22) Filed: Oct. 1, 2010

(65) Prior Publication Data

US 2011/0219265 A1   Sep. 8, 2011

(30) Foreign Application Priority Data

Mar. 2, 2010   (JP) ................................. 2010-045736

(51) Int. Cl.
*G06F 9/44*   (2006.01)
(52) U.S. Cl.
USPC ......................................................... 717/126
(58) Field of Classification Search
USPC ................................................. 717/126, 127
See application file for complete search history.

(56) References Cited

U.S. PATENT DOCUMENTS

| 7,890,806 B2* | 2/2011 | Kwong et al. | 717/124 |
| 2004/0015973 A1* | 1/2004 | Skovira | 718/103 |
| 2007/0106912 A1* | 5/2007 | Tanaka | 713/193 |
| 2008/0098365 A1* | 4/2008 | Kumar | 717/131 |

FOREIGN PATENT DOCUMENTS

| JP | 11-238036 A | 8/1999 |
| JP | 2005-141663 A | 6/2005 |
| JP | 2006-302170 A | 11/2006 |
| JP | 2008-210308 A | 9/2008 |
| JP | 2009-110220 A | 5/2009 |

\* cited by examiner

*Primary Examiner* — Anna Deng
(74) *Attorney, Agent, or Firm* — Sughrue Mion, PLLC

(57) ABSTRACT

A computer readable medium storing a program causing a computer to execute a process for verification support, the process includes: acquiring information of a timing of transmission of a process request for operating a program to-be-verified; acquiring first record information of a transfer process in a time zone corresponding to the acquired timing of the transmission, from a transfer device which transfers the process request to any of a plurality of information processing devices capable of running the program to-be-verified and which records the transfer process; specifying the information processing device to which the process request has been transferred, on the basis of the acquired first record information of the transfer process; and acquiring second record information of a process in the time zone corresponding to the timing of the transmission, from the specified information processing device.

6 Claims, 6 Drawing Sheets

FIG. 3

| | 421a | 421b | 421c | 421d | 421e |
| | SERIAL NO. | DATE | TIME | CLIENT IP ADDRESS | TRANSFER DESTINATION SERVER |
|---|---|---|---|---|---|
| 421f | 1000 | 2010/2/20 | 09:58:56 | 123.234.345.452 | SECOND APPLICATION SERVER |
| 421g | 1001 | 2010/2/20 | 10:00:01 | 123.234.345.451 | FIRST APPLICATION SERVER |
| 421h | 1002 | 2010/2/20 | 10:00:06 | 123.234.345.453 | SECOND APPLICATION SERVER |
| 421i | 1003 | 2010/2/20 | 10:00:09 | 123.234.345.451 | FIRST APPLICATION SERVER |

421

COMPUTER READABLE MEDIUM, VERIFICATION SUPPORT METHOD AND VERIFICATION SUPPORT APPARATUS

CROSS-REFERENCE TO RELATED APPLICATIONS

This application is based on and claims priority under 35 USC 119 from Japanese Patent Application No. 2010-045736 filed on Mar. 2, 2010.

BACKGROUND

1. Technical Field

The present invention relates to a computer readable medium and a verification support apparatus.

2. Related Art

There is proposed an evaluation method in which, a system including a computer where software is operated is evaluated using a log indicating the operation result of the software.

SUMMARY

According to an aspect of the invention, a computer readable medium storing a program causing a computer to execute a process for verification support, the process includes: acquiring information of a timing of transmission of a process request for operating a program to-be-verified; acquiring first record information of a transfer process in a time zone corresponding to the acquired timing of the transmission, from a transfer device which transfers the process request to any of a plurality of information processing devices capable of running the program to-be-verified and which records the transfer process; specifying the information processing device to which the process request has been transferred, on the basis of the acquired first record information of the transfer process; and acquiring second record information of a process in the time zone corresponding to the timing of the transmission, from the specified information processing device.

BRIEF DESCRIPTION OF THE DRAWINGS

Exemplary embodiment(s) of the present invention will be described in detail based on the following figures, wherein:

FIG. 3 is an explanatory diagram showing an example of first record information according to the first exemplary embodiment of the present invention;

DETAILED DESCRIPTION

First Exemplary Embodiment

Figure 1:
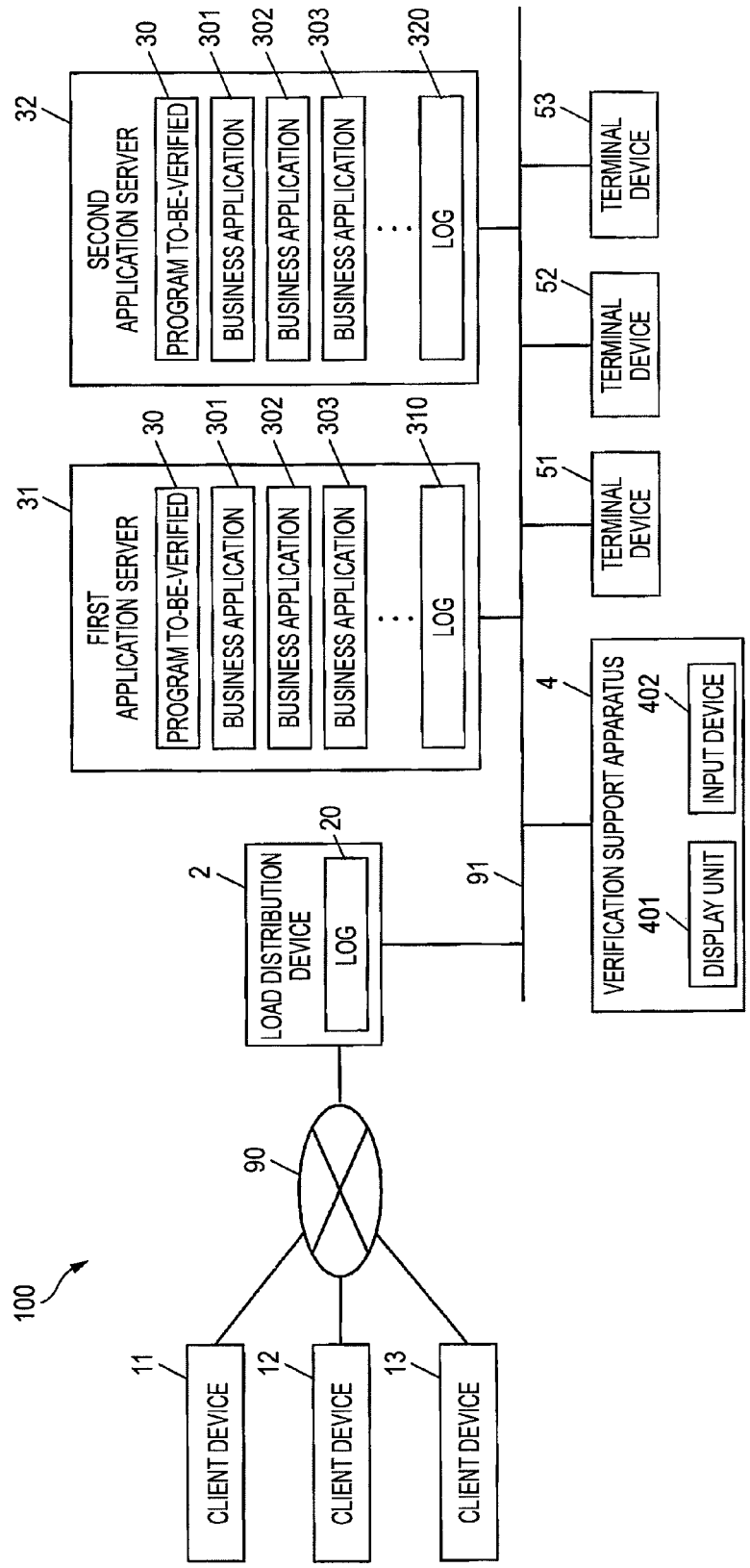
FIG. 1 is a general diagram showing a schematic example of a verification system to which a verification support apparatus according to the first exemplary embodiment of the present invention has been applied.

FIG. 1 is a general diagram showing a schematic example of a verification system to which a verification support apparatus according to the first exemplary embodiment of the present invention has been applied.

This verification system 100 is configured having plural client devices 11, 12, 13, ... which transmit process requests, first and second application servers 31 and 32 which are examples of information processing devices for executing the process requests, a load distribution device 2 which is an example of a transfer device for transferring the process requests accepted from the client devices 11, 12, 13, ..., to either of the first and second application servers 31 and 32, the verification support apparatus 4 which is connected to the load distribution device 2, the first application server 31 and the second application server 32, and plural terminal devices 51, 52, 53, ... which perform communications with the verification support apparatus 4.

The client devices 11, 12, 13, ... and the load distribution device 2 are connected so as to be capable of transmitting and receiving information through a wide-area communication network 90 such as the Internet. Besides, the load distribution device 2, the first and second application servers 31 and 32, the verification support apparatus 4 and the terminal devices 51, 52, 53, ... are connected so as to be capable of transmitting and receiving information through a local-area communication network 91 such as a LAN (Local Area Network). The wide-area communication network 90 and the local-area communication network 91 may be either wired (with electric cables, optical cables, or the likes) or wireless (with radio waves, infrared radiations, or the likes).

The client devices 11, 12, 13, ..., the load distribution device 2, the first and second application servers 31 and 32, the verification support apparatus 4, and the terminal devices 51, 52, 53, ... perform the communications among them, on the basis of the protocols of TCP/IP (Transmission Control Protocol/Internet Protocol) and HTTP (HyperText Transfer Protocol).

Each of the client devices 11, 12, 13, ... is, for example, a computer or a portable information terminal device, or a multifunctional machine which has a copy function or printer function, a scanner function, etc. Besides, the process request which is transmitted by each of the client devices 11, 12, 13, ... causes the first application server 31 or the second application server 32 to execute any information process, on the basis of the content thereof. By way of example, the process request is a command for requesting the first application server 31 or the second application server 32 to deliver any output, or information to be processed by the information process which is being executed by the first application server 31 or the second application server 32.

In the ensuing description, it shall be assumed that "123. 234. 345. 451" is set as an IP address for the client device 11, that "123. 234. 345. 452" is set as an IP address for the client device 12, and that "123. 234. 345. 453" is set as an IP address for the client device 13.

The first application server 31 and the second application server 32 are redundant servers in order to distribute a load and to enhance a reliability. They include operating systems having the same functions as each other, middleware items, pluralities of application software items, databases required for executing the application software items, etc.

The application software items which the first and second application servers 31 and 32 store, contain programs to-beverified 30 which are the application software items to be verified by the verification system 100, and pluralities of business applications 301, 302, 303, . . . which serve to transact business items such as a stock management and an ordering process. Besides, the first and second application servers 31 and 32 have the log functions of storing the information items of the processed results of the application software items as respective logs 310 and 320, together with the information items of process execution timings.

The load distribution device 2 transfers the process requests accepted from the client devices 11, 12, 13, . . . , to either the first application server 31 or the second application server 32. As algorithms in conformity with which the load distribution device 2 selects the transfer destinations of the process requests, there have been known, for example, the round-robin scheme in which the respective application servers are selected in succession, the least load scheme in which the application server of the least load is selected, and the fastest scheme in which the application server responding fastest is selected. The load distribution device 2 has the log function of storing the record of the transfer process as a log 20, together with the information of a transfer timing.

The verification support apparatus 4 includes a display unit 401 which presents a display to the user, and an input device 402 such as a keyboard or a pointing device.

Each of the terminal devices 51, 52, 53, . . . is configured of, for example, a personal computer, and it can receive information such as a verification result outputted from the verification support apparatus 4, in the form of, for example, electronic mail and present the information to the user.

(Configuration of Verification Support Apparatus)

Figure 2:
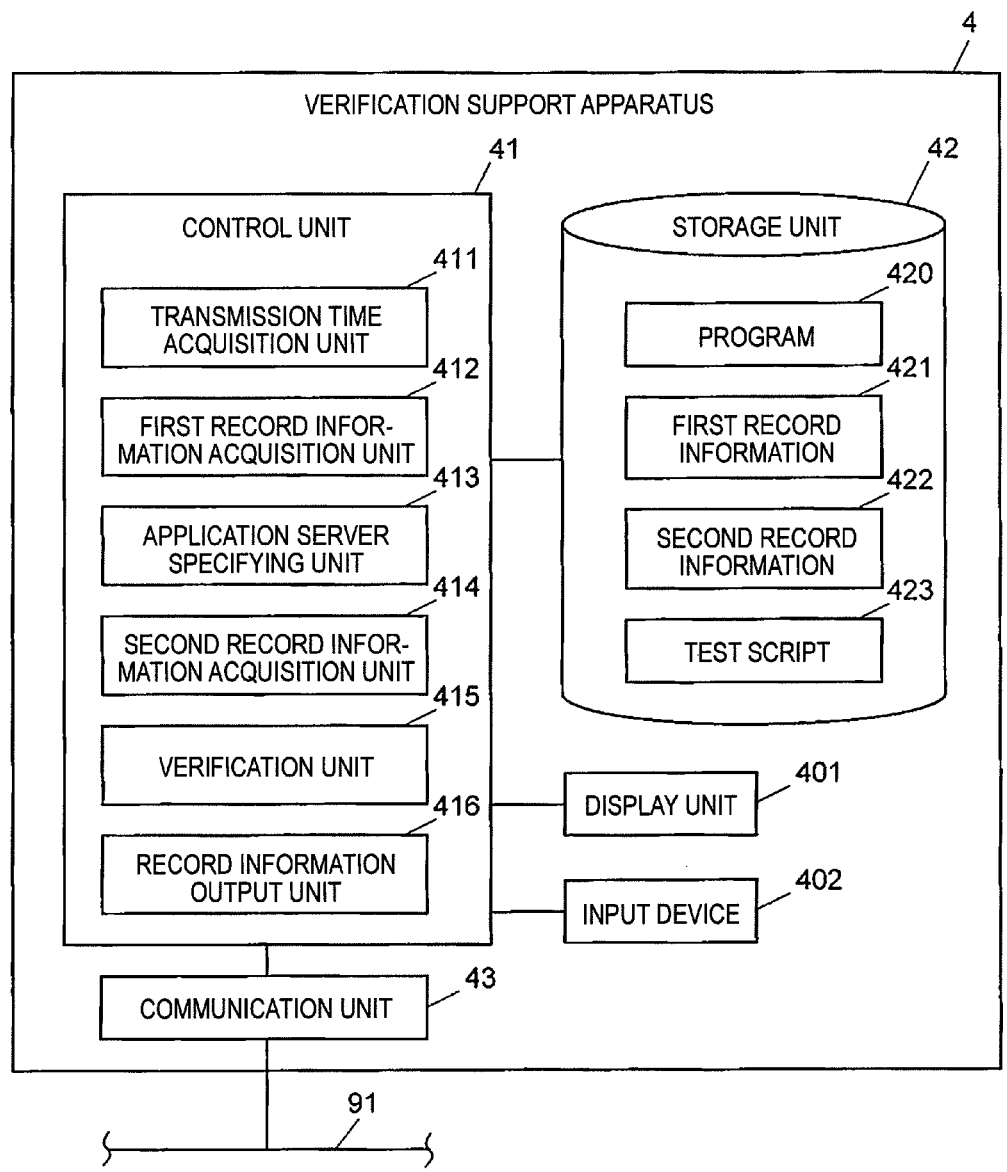
FIG. 2 is a block diagram showing a schematic example of the verification support apparatus according to the first exemplary embodiment of the present invention.

FIG. 2 is a block diagram showing a schematic example of the verification support apparatus 4. The verification support apparatus 4 is configured having a control unit 41 which is constituted by electronic components such as a CPU (Central Processing Unit), a storage unit 42 which is constituted by a magnetic disk, a ROM (Read Only Memory), a RAM (Random Access Memory), etc., a communication unit 43 which communicates with the load distribution device 2, the terminal devices 51, 52, 53, . . . , etc., the display unit 401, and the input device 402.

The control unit 41 has the CPU operated in accordance with a verification support program 420 stored in the storage unit 42, thereby to function as a transmission time acquisition unit 411, a first record information acquisition unit 412, a application server specifying unit 413, a second record information acquisition unit 414, a verification unit 415, and a record information output unit 416.

The storage unit 42 stores therein the verification support program 420, first record information 421 which indicates the record of the transfer process as acquired from the load distribution device 2, second record information 422 which indicates the record of the process of the application software as acquired from the first application server 31 or the second application server 32, and a test script 423 which contains information on a verification test as created by the user.

The transmission time acquisition unit 411 acquires the information of a transmission time at which the process request for operating the program to-be-verified 30 (hereinbelow, this process request shall be termed the "verification process request") is transmitted from any of the client devices 11, 12, 13, . . . . The information of a date is also contained in this information. Besides, the transmission time acquisition unit 411 acquires the information of the IP address of the client device which transmits the verification process request, together with the information of the transmission time of the verification process request. The transmission time acquisition unit 411 acquires these information items by the input manipulation of the user from the input device 402 or by a transmission from any of the terminal devices 51, 52, 53, . . . .

The first record information acquisition unit 412 acquires from the load distribution device 2, the log 20 in which the transfer process by the load distribution device 2 in a time zone corresponding to the transmission time of the verification process request is recorded, so as to store the acquired log 20 in the storage unit 42 as the first record information 421.

More specifically, the first record information acquisition unit 412 appoints the time zone including the transmission time of the verification process request and requests the load distribution device 2 to transmit the record information of the transfer process based on this load distribution device 2 in the time zone. Then, the load distribution device 2 transmits the record information of the transfer process in compliance with the request.

In a case, for example, where the transmission time of the verification process request is 10:00:00 on Feb. 20, 2010, the first record information acquisition unit 412 acquires from the load distribution device 2, the record information of the transfer process in the time zone including this transmission time (for example, from 5 seconds before the transmission time, to 10 seconds after the same).

FIG. 3 is a diagram showing an example of the first record information 421, in a table form. In the example shown in this diagram, a serial No. column 421a which indicates the serial Nos. of the process requests, a date column 421b and a time column 421c which indicate the reception timings of the process requests, a client IP address column 421d which indicates the IP addresses of the transmission sources of the process requests, and a transfer-destination application server column 421e which indicates the transfer destinations of the process requests are provided in respective rows, while individual columns 421f, 421g, 421h and 421i are provided in correspondence with the serial Nos. 1000, 1001, 1002 and 1003 of the process requests, in respective lines. In addition, various information items are recorded in cells which are formed by the respective columns.

The application server specifying unit 413 specifies the application server to which the verification process request has been transferred, on the basis of the information of the transmission time of the verification process request as has been acquired by the transmission time acquisition unit 411, and the information recorded in the first record information 421.

More specifically, the application server specifying unit 413 refers to the first record information 421 and judges as the verification process request, the process request which is the earliest at or after the transmission time of the verification process request, among the process requests about which the IP address of the transmission source of the process request as indicated in the client IP address column 421d agrees with the IP address of the client device transmitting the verification process request.

In addition, the application server specifying unit 413 refers to the transfer destination server column 421e of the first record information 421 and specifies the application server of the transfer destination of the process request as the application server to which the verification process request has been transferred.

Now, there will be described a case where the application server which transmits the verification process request is the client device 11.

In the example shown in FIG. 3, the earliest process request (the process request of serial No. 1001) among the process requests about which the IP address of the transmission source of the process request agrees with the IP address ("123. 234. 345. 451") of the client device 11 at or after the transmission time (10:00:00 on Feb. 20, 2010) of the verification process request is judged to be the verification process request, and the transfer destination server (the first application server 31) of the column 421g corresponding to the process No. 1001 is specified as the application server to which the verification process request has been transferred. Hereinbelow, the specified application server shall be termed the "specification application server".

The second record information acquisition unit 414 acquires the record information of the process in the time zone corresponding to the transmission time of the verification process request, from the specification application server specified by the application server specifying unit 413, and it stores the acquired record information in the storage unit 42 as the second record information 422.

More specifically, the second record information acquisition unit 414 appoints the time zone including the transmission time of the verification process request and requests the specification application server to transmit the record information of the process based on the specification application server in the time zone. Then, the specification application server transmits the record information of the transfer process in compliance with the request.

In the case, for example, where the transmission time of the verification process request is 10:00:00 on Feb. 20, 2010, the second record information acquisition unit 414 acquires from the specification application server, the record information (the log 310 or the log 320) of the process executed by the specification application server in the time zone including the transmission time (for example, from the transmission time to 15 seconds later).

Figure 4:
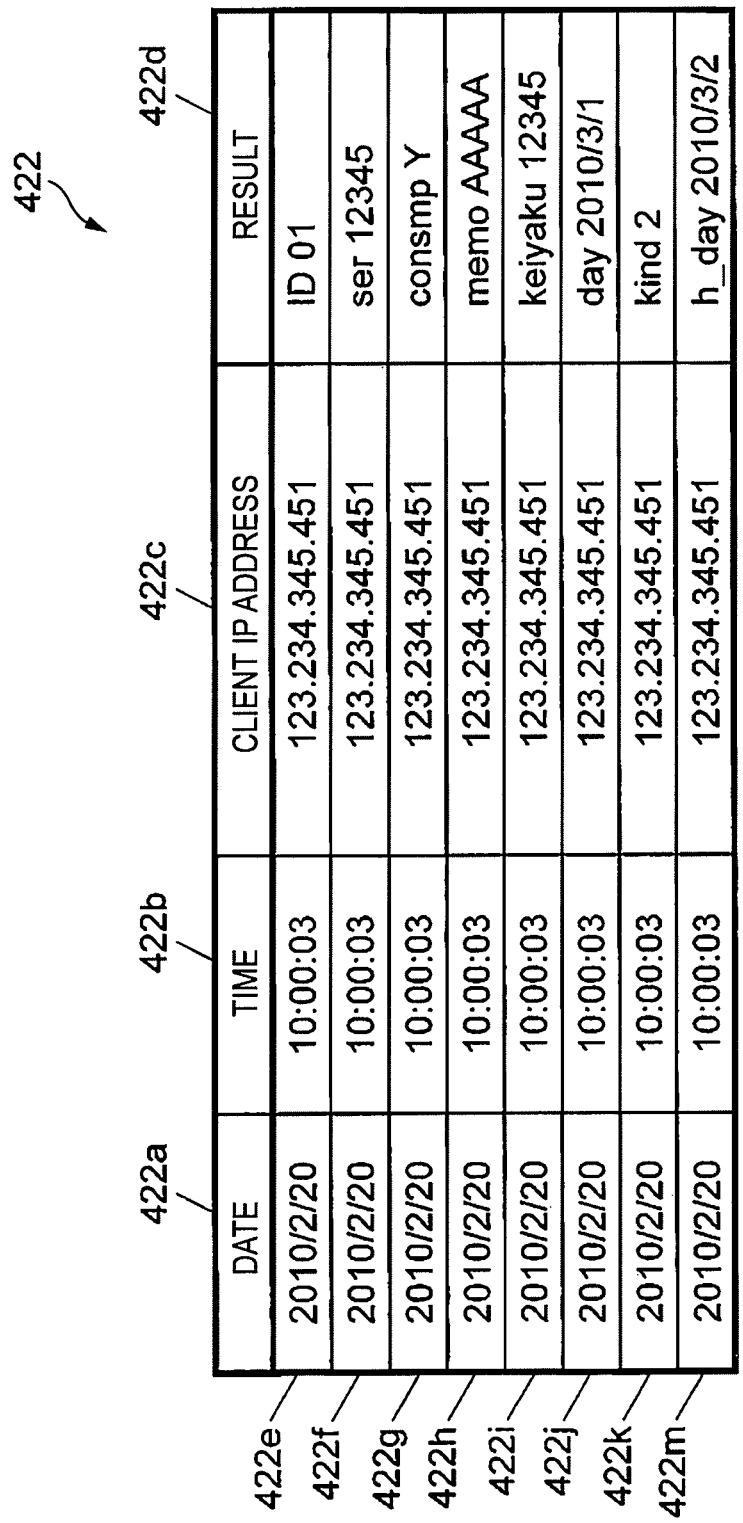
FIG. 4 is an explanatory diagram showing an example of second record information according to the first exemplary embodiment of the present invention.

FIG. 4 is a diagram showing an example of the second record information 422, in a table form. In the example shown in this diagram, a date column 422a and a time column 422b which indicate the execution timing of a process, a client IP address column 422c which indicates the IP address of the client device having made a request for the process, and a process result column 422d which indicates the content of an output being the result of the process are provided in respective rows, while individual columns 422e, 422f, 422g, 422h, 422i, 422j, 422k and 422m are provided in correspondence with the process results, in respective lines. In addition, various information items are recorded in cells which are formed by the respective columns.

This diagram exemplifies the record information of the process of the specification application server (the first application server 31) in the case where the client device 11 is a multifunctional machine having a copy function and a printer function, and where information indicating the decrease of the reserve of a yellow toner has been transmitted as the process request to-be-handled.

"ID 01", "ser 12345", "consmp Y", "memo AAAAA", "keiyaku 12345", "day 2010/3/1", "kind 2" and "h_day 2010/ 3/2" which are recorded in the process result column 422d indicate a machine type code, the serial No. of the multifunctional machine, the name of a consumable, an ordering memo, an ordering contact serial No., an order request day, an order sort and an order information registration day, respectively.

The first application server 31 executes the process in accordance with the program to-be-verified 30, thereby to derive these information items on the basis of the content of the process request and the information registered in the database stored in the first application server 31 and to transmit the process results to another server device executing the ordering process of the consumable, etc.

The verification unit 415 verifies the operation of the program to-be-verified 30 on the basis of the second record information 422 acquired by the second record information acquisition unit 414, and outputs the verified result.

Prior to the verification of the program to-be-verified 30, the verification unit 415 registers the information of the process results which the specification client server ought to output in a case where the process of the program to-be-verified 30 has proceeded as per designed specifications.

The verification unit 415 acquires the test script 423 which contains the start time of the verification of the program to-be-verified 30 (the transmission time of the verification process request), the IP address of the client device where the verification process request is transmitted, and information items such as the process procedure of the verification and a person in charge of the development of the program to-be-verified 30, in addition to the information of the process results, through the input manipulation of the user from the input device 402 or communications from the terminal device 51, 52, 53, . . . , and it stores the acquired test script in the storage unit 42.

When the second record information acquisition unit 414 has acquired the second record information 422 from the specification application server, the verification unit 415 decides whether or not the process results indicated in the second record information 422 and the contents of the test script 423 agree, and it outputs the decided result as a verification result.

More specifically, character information items, for example, "ID 01", "ser 12345", "consmp Y", "memo AAAAA", "keiyaku 12345", "day 2010/3/1", "kind 2" and "h_day 2010/3/2" are recorded as supposed process results in the test script 423. Accordingly, if these information items are contained in the second record information 422 is checked, and the agreement of the contents is decided when the information items are contained.

In a case where the result of the decision of the verification unit 415 is negative (where the contents do not agree), the record information output unit 416 outputs the second record information 422 acquired by the second record information acquisition unit 414. This output is presented by, for example, being displayed on the display unit 401 or being transmitted to the terminal device 51, 52, 53, . . . . Besides, in a case where a printer is connected to the verification support apparatus 4, the contents of the second record information 422 may well be printed on a printing paper sheet. Further, the output may well be made by transmitting the second record information 422 to the client device which has transmitted the verification process request.

Figure 5A:
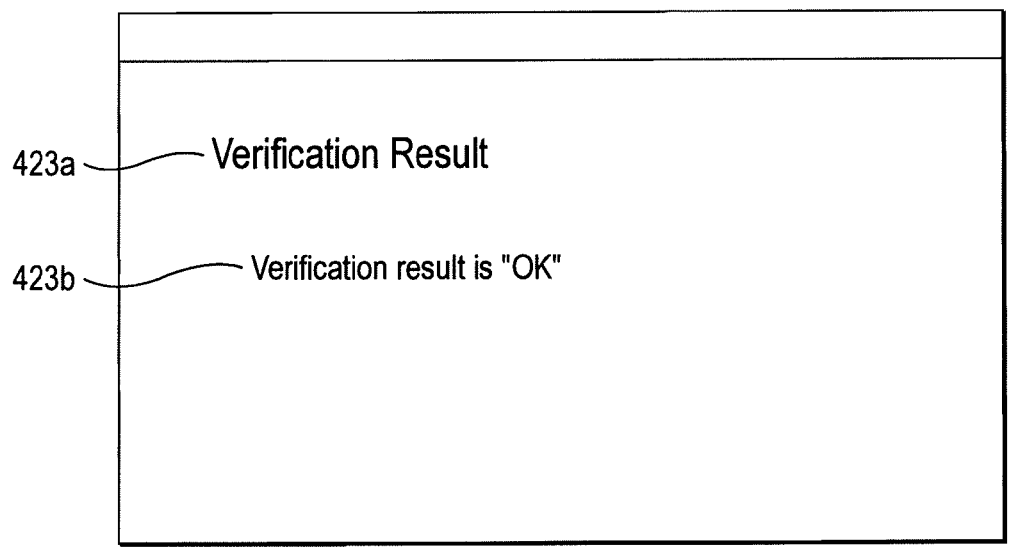
FIGS. 5A and 5B are diagrams each showing an example of the display screen of a verification result which verification unit according to the first exemplary embodiment of the present invention displays on a display unit, and FIG. 5A exemplifies a verification normal-end screen, while FIG. 5B exemplifies an error screen.
Figure 5B:
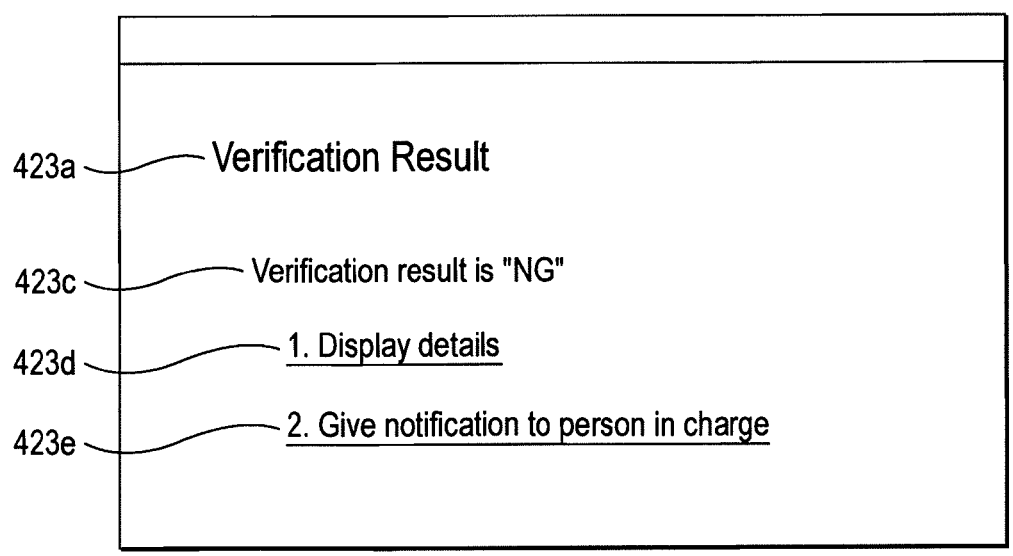

FIGS. 5A and 5B are diagrams each showing an example of the display screen of the verification result which the verification unit 415 displays on the display unit 401, and FIG. 5A shows a normal-end screen in the case where the verification result is "OK", while FIG. 5B shows an error screen in the case where the verification result is "NG".

Subject to the decision that the process results indicated in the second record information 422 and the contents of the test script 423 agree, the verification unit 415 displays the normal-end screen shown in FIG. 5A. This normal-end screen contains the display 423a of the "verification result" as indicates that the verification result will be displayed, and a display 423b which indicates that the verification result is "OK". Owing to this screen, the user visually confirms that the verification result of the program to-be-verified 30 is as per the designed specifications.

Besides, subject to the decision that the process results indicated in the second record information 422 and the contents of the test script 423 disagree, the verification unit 415 displays the error screen shown in FIG. 5B. This error screen contains the display 423a of the "verification result" as indicates that the verification result will be displayed, a display 423c which indicates that the verification result is "NG", a display 423d for which a link permitting the user to select the display of the details of the verification result is set, and a display 423e for which a link permitting the user to select the notification of the result to the person in charge of the development of the program to-be-verified 30 through electronic mail or the like is set.

When the user selects the display 423d with the pointing device or the like input device, the record information output unit 416 displays the contents of the second record information 422 on the display unit 401. On this occasion, the contents of the second record information 422 may well be displayed in correspondence with the contents of the supposed process results contained in the test script 423.

Besides, when the user selects the display 423e, the record information output unit 416 transmits the electronic mail to the person in charge of the development, thereby to notify the verification result. The person in charge of the development receives the notification with the terminal device 51, 52, 53, .... The contents of the second record information 422 are contained in the electronic mail. In addition, the person in charge of the development investigates a cause for the "NG" of the verification result, on the basis of the contents of the second record information 422, and he/she revises the program to-be-verified 30.

(Operation of Verification Support Apparatus)

Next, the operation of the verification support apparatus 4 will be described with reference to FIG. 1 through FIG. 6.

Figure 6:
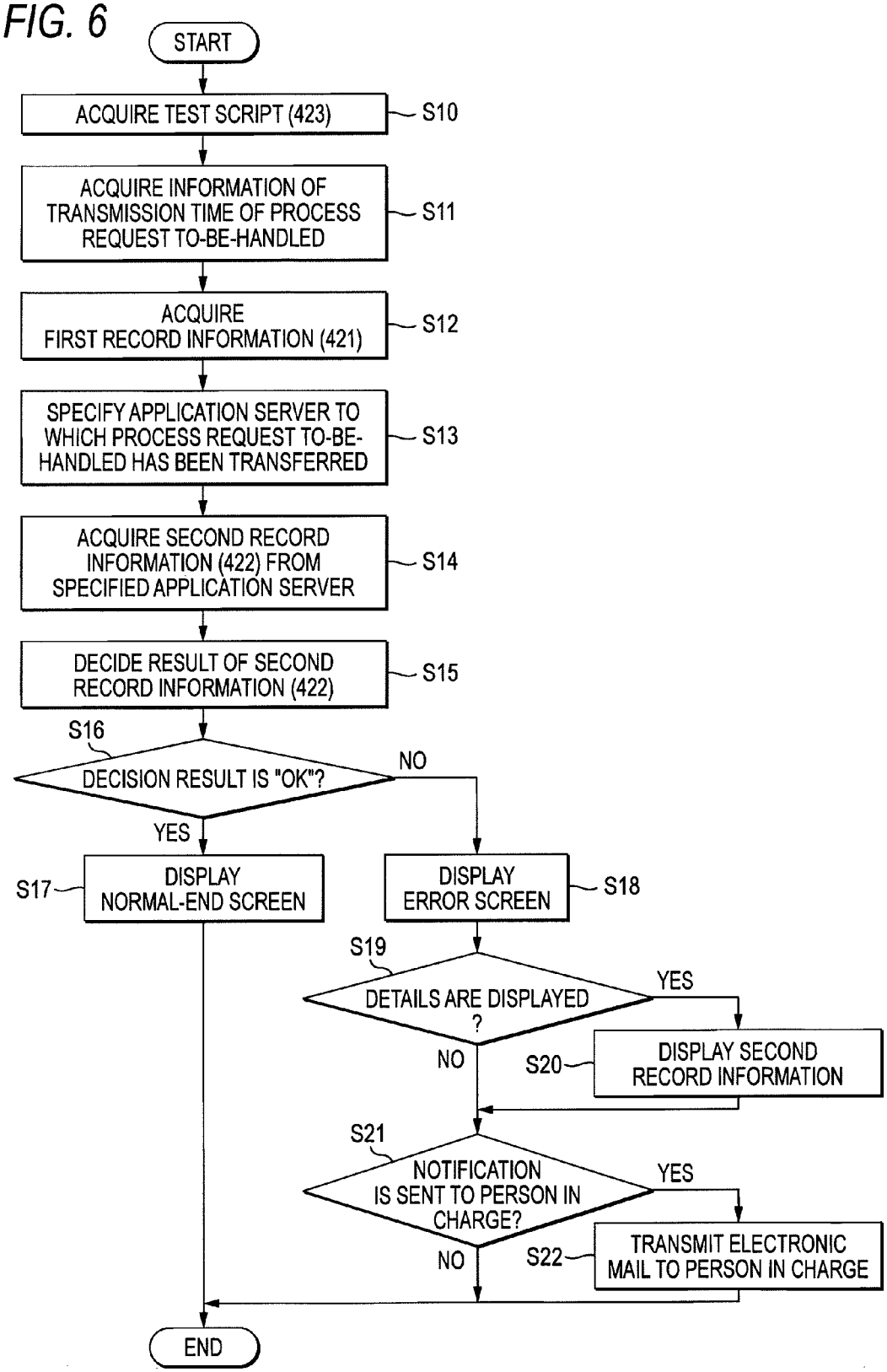
FIG. 6 is a flow chart showing the operating procedure of the verification support apparatus according to the first exemplary embodiment of the present invention.

FIG. 6 is a flow chart showing the operating procedure of the verification support apparatus 4.

The verification unit 415 of the verification support apparatus 4 acquires the test script 423 through the input manipulation of the user from the input device 402 or the communications from the terminal device 51, 52, 53, . . . (S10).

Subsequently, the transmission time acquisition unit 411 acquires the information of the time at which the process request to-be-handled is transmitted from the client device, on the basis of the contents of the test script 423 (S11).

Subsequently, the first record information acquisition unit 412 acquires the first record information 421 from the load distribution device 2 after the lapse of the transmission time acquired at the step S11 (S12).

Subsequently, the application server specifying unit 413 specifies the application server to which the process request to-be-handled has been transferred, on the basis of the first record information 421 acquired at the step S12 (S13).

Subsequently, the second record information acquisition unit 414 acquires the second record information 422 containing the record of the result of the process for the process request to-be-handled, from the application server specified at the step S13 (S14).

Subsequently, the verification unit 415 collates the result information of the second record information 422 acquired at the step S14, with the information of the test script 423 acquired at the step S10, thereby to decide whether or not the result information and the test script agree (S15).

In a case where the result of the decision of the step S15 is "OK" (the result information and the test script agree) (S16; Yes), the verification unit 415 displays the normal-end screen (shown in FIG. 5A) on the display unit 401 (S17).

On the other hand, in a case where the result of the decision of the step S15 is "NG" (the result information and the test script disagree) (S16; No), the verification unit 415 displays the error screen (shown in FIG. 5B) on the display unit 401 (S18).

When the user selects the display 423d in the error screen with the input device 402, thereby to give the instruction of displaying the details (S19; Yes), the record information output unit 416 displays the second record information 422 indicating the process results of the specification application server, on the display unit 401 (S20).

Besides, when the user selects the display 423e in the error screen with the input device 402, thereby to give the instruction of sending the notification to the person in charge of the development (S21; Yes), the verification unit 415 transmits the electronic mail to the person in charge of the development and notifies the verification result (S22).

Second Exemplary Embodiment

In the first embodiment, the verification support apparatus 4 verifies the program to-be-verified 30 on the basis of the second record information 421 and outputs the verification result. In this embodiment, however, the verification support apparatus 4 does not judge the propriety of the verification, but the record information output unit 416 outputs the second record information 422. In addition, the person in charge of the development of the program to-be-verified 30 judges the propriety of the verification on the basis of the contents of the second record information 422 and revises the program to-be-verified 30 as may be needed.

Other Embodiments

Incidentally, the present invention is not restricted to the foregoing embodiments, but it is capable of various modifications within a scope not altering the purport thereof. By way of example, the number of the client devices and the number of the application server devices are not limited, and the scale of the system can be expanded or contracted. Besides, the verification support apparatus 4 may well be configured so as to be built in the load distribution device 2.

Besides, the verification system 100 is not limited to the employment of a system used in actual business, but it may well be experimentally built for the verification of the program to-be-verified 30.

Besides, the program which is used in each of the foregoing embodiments may be loaded into the storage unit within the apparatus from a CD-ROM or the like record medium, or it may well be downloaded into the storage unit within the apparatus from a server or the like which is connected to a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for verification support, the process comprising:
   acquiring transmission timing information that indicates a time when a request for operating a program to-be-verified was transmitted;
   acquiring, from a transfer device which transfers the request for operating the program to-be-verified to any of a plurality of information processing devices capable of running the program to-be-verified and which generates a record about transfer process, first record information that comprises logs about transfer processes performed by the transfer device in a time range corresponding to the time when the request for operating the program to-be-verified was transmitted;
   determining an information processing device to which the request for operating the program to-be-verified has been transferred among the plurality of information processing devices capable of running the program to-be-verified, on the basis of the acquired first record information;
   acquiring, from the information processing device to which the request has been transferred, second record information that comprises logs about processing results performed by the information processing device to which the request has been transferred in the time range corresponding to the time when the request for operating the program to-be-verified was transmitted; and
   outputting information which indicates whether or not the acquired second record information agrees with information registered beforehand, and the acquired second record information, if the acquired second record information does not agree with the information registered beforehand.

2. The non-transitory computer readable medium according to claim 1, wherein the program to-be-verified relates to a transact business item of a stock management or an ordering process.

3. A verification support method comprising:
   acquiring, using a processor, transmission timing information that indicates a time when a request for operating a program to-be-verified was transmitted;
   acquiring, from a transfer device which transfers the request for operating the program to-be-verified to any of a plurality of information processing devices capable of running the program to-be-verified and which generates a record about transfer process, first record information that comprises logs about transfer processes performed by the transfer device in a time range corresponding to the time when the request for operating the program to-be-verified was transmitted;
   determining an information processing device to which the request for operating the program to-be-verified has been transferred among the plurality of information processing devices capable of running the program to-be-verified, on the basis of the acquired first record information;
   acquiring, from the information processing device to which the request has been transferred, second record information that comprises logs about processing results performed by the information processing device to which the request has been transferred in the time range corresponding to the time when the request for operating the program to-be-verified was transmitted; and
   outputting information which indicates whether or not the acquired second record information agrees with information registered beforehand, and the acquired second record information, if the acquired second record information does not agree with the information registered beforehand.

4. The verification support method according to claim 3, wherein the program to-be-verified relates to a transact business item of a stock management or an ordering process.

5. A verification support apparatus comprising:
   a transmission timing acquisition unit comprising a processor that acquires transmission timing information that indicates a time when a request for operating a program to-be-verified was transmitted;
   a first record information acquisition unit that acquires, from a transfer device which transfers the request for operating the program to-be-verified to any of a plurality of information processing devices capable of running the program to-be-verified and which generates a record about transfer process, first record information that comprises logs about transfer processes performed by the transfer device in a time range corresponding to the time when the request for operating the program to-be-verified was transmitted;
   a determining unit that determines an information processing device to which the request for operating the program to-be-verified has been transferred among the plurality of information processing devices capable of running the program to-be-verified, on the basis of the acquired first record information;
   a second record information acquisition unit that acquires, from the information processing device to which the request has been transferred, second record information that comprises logs about processing results performed by the information processing device to which the request has been transferred in the time range corresponding to the time when the request for operating the program to-be-verified was transmitted;
   an output unit that outputs information which indicates whether or not the acquired second record information agrees with information registered beforehand, and the acquired second record information, if the acquired second record information does not agree with the information registered beforehand.

6. The verification support apparatus according to claim 5, wherein the program to-be-verified relates to a transact business item of a stock management or an ordering process.

* * * * *